UNITED STATES PATENT OFFICE.

CHARLES H. JAXTHEIMER, OF NEW WILMINGTON, PENNSYLVANIA.

PROCESS OF MAKING FIRE-BRICK.

1,018,665. Specification of Letters Patent. Patented Feb. 27, 1912.

No Drawing. Application filed September 13, 1910. Serial No. 581,866.

*To all whom it may concern:*

Be it known that I, CHARLES H. JAXTHEIMER, a citizen of the United States, residing at New Wilmington, in the county of Lawrence and State of Pennsylvania, have invented certain new and useful Improvements in Processes of Making Fire-Bricks, of which the following is a specification.

This invention relates to a process of making fire bricks, and more particularly refractory brick known as acid linings for steel converters.

The object of the invention is to produce an improved brick which will not check or crack and which the furnace slag will not penetrate, and which will have increased heat resisting qualities.

The invention embodies particularly the use of an improved bond for filling the voids in the sand, the bond consisting especially of silica flour mixed with slaked lime and sodium carbonate, with or without a little clay rich in aluminum oxid. It is especially important that the proportion of the bond used be proper to fill the voids, and that the bond will chemically combine and fuse, forming a brick of great heat capacity, or a capacity as near that of pure silica as possible.

In making the brick, silica sand ($SiO_2$) of as high a purity as possible is taken and with this is combined a bond consisting of silica flour mixed with a quantity up to 10% of slaked lime ($CaO_2H_2$) and sodium carbonate ($Na_2CO_3$) with or without a little clay high in aluminum oxid ($Al_2O_3$). If the clay is added, proportionately less of the silica flour is used.

To determine the quantity of bond to use, the voids in the sand are first measured, by any of the well known methods, and a similar amount of the bond is provided. The bond is then mixed with the sand, with the addition of a little water or molasses water to make it plastic for molding. The mixing is preferably done in a wet pan or mixer, which is allowed to run until the bond and silica are intimately mixed to make a dense and thoroughly mixed compound. The bricks are then molded from the mass into shape, and set out on trays to dry to allow the lime to set, or in other words, to change to calcium carbonate ($CaCO_3$). After the bricks have become sufficiently set they are dried out on a drying floor, or they may be hardened by steam or other process. They are then fused. The temperature of burning must correspond as nearly as possible to the temperature at which the bricks are to be used, for which purpose the temperature of the furnace is determined, and then the bricks are fired or baked to the same heat, to give them complete expansion. The fusion forms calcium sodium silicate ($CaNaSiO_3$), which overcomes checking or cracking, due to the combination of the calcium and sodium with the silica oxid. Inasmuch as calcium glass ($CaSiO_3$) expands and sodium glass ($NaSiO_3$) contracts, the expansion and contraction are neutralized. Other carbonates, such as those of potassium or nickel, or any combination of carbonates, provided one expands and the other one contracts, may be used, but sodium and lime are used because of their cheapness. The mixture of the silica flour with these carbonates produces a fluxing bond which fills all the voids of the silica and results in a fire brick of dense and homogeneous quality, and by observing the proper proportions and the purity of materials, a very satisfactory brick is produced. A very small portion of clay, kaolin or aluminum ore of high purity may be used in the bond, particularly if a lesser heat resistance is permissible.

I am aware that the use of lime, sodas and clay for bonds has been proposed, but none of these form a dense compound, or if enough were added to fill the voids the mass would be easily fluxed, wherefore I add silica flour as a part of the bond.

Having thus described my invention what I claim as new and desire to secure by Letters Patent is:—

1. The process of making fire brick, comprising mixing silica sand with a bond made of silica flour, slaked lime, and sodium carbonate, molding the mixture into bricks, and fusing the same.

2. The process of making fire brick, comprising mixing silica sand with a bond equal in quantity to the voids in the sand, said bond made of silica flour, slaked lime and an alkaline carbonate, molding the mixture into bricks, and fusing the same.

2. The process of making fire brick, consisting of mixing silica sand with a bond composed of silica flour, slaked lime and an alkaline carbonate, which carbonate when combined with silica forms a compound which contracts under heat, molding said mixture into bricks, and fusing the same.

In testimony whereof, I affix my signature in presence of two witnesses.

CHARLES H. JAXTHEIMER.

Witnesses:
 Geo. W. Perkins,
 W. R. Thompson.